United States Patent
Nagel et al.

(10) Patent No.: US 12,298,977 B1
(45) Date of Patent: May 13, 2025

(54) DYNAMIC SELECTION OF DATABASE DATA TOPOLOGIES FOR PERFORMING QUERIES

(71) Applicant: Amazon Technologies, Inc., Seattle, WA (US)

(72) Inventors: Fabian Oliver Nagel, Mountain View, CA (US); Chunbin Lin, Dublin, CA (US); Ippokratis Pandis, Menlo Park, CA (US); Naresh Chainani, Mountain View, CA (US); Mengchu Cai, San Jose, CA (US); Krishna Chaitanya Gudipati, Fremont, CA (US); Sanjay Wangoo, San Ramon, CA (US); Qichen Zhang, Newark, CA (US); Nikolaos Armenatzoglou, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,293

(22) Filed: Jun. 30, 2022

(51) Int. Cl.
*G06F 15/16* (2006.01)
*G06F 16/2453* (2019.01)

(52) U.S. Cl.
CPC .............................. *G06F 16/24545* (2019.01)

(58) Field of Classification Search
None
See application file for complete search history.

(56) References Cited

U.S. PATENT DOCUMENTS

| | | | |
|---|---|---|---|
| 7,650,356 | B2 | 1/2010 | Raheem |
| 8,626,717 | B2 | 1/2014 | Bendakovsky et al. |
| 8,898,115 | B1 | 11/2014 | Gunda et al. |
| 10,216,770 | B1* | 2/2019 | Kulesza ................. G06F 16/21 |
| 10,268,710 | B2 | 4/2019 | Hu et al. |
| 10,740,353 | B2 | 8/2020 | Horowitz et al. |
| 10,846,305 | B2 | 11/2020 | Merriman et al. |
| 10,896,097 | B1 | 1/2021 | Purcell |
| 10,977,277 | B2 | 4/2021 | Merriman et al. |
| 11,210,184 | B1 | 12/2021 | Gupta et al. |
| 2012/0151026 | A1* | 6/2012 | Chen ................... H04L 12/6418 709/223 |
| 2013/0151505 | A1* | 6/2013 | Yoon .................. G06F 16/2453 707/718 |
| 2014/0114952 | A1* | 4/2014 | Robinson .......... G06F 16/24532 707/718 |
| 2020/0019474 | A1 | 1/2020 | Yoon |
| 2020/0050694 | A1 | 2/2020 | Avalani |
| 2020/0327146 | A1* | 10/2020 | Hoeppner ............. G06F 16/278 |
| 2021/0303570 | A1* | 9/2021 | Kondiles ................ H04L 45/02 |

(Continued)

OTHER PUBLICATIONS

Amazon Redshift Cluster Management Guide, 2020, pp. 1-397.*

(Continued)

*Primary Examiner* — Alex Gofman
(74) *Attorney, Agent, or Firm* — S. Scott Foster; Kowert, Hood, Munyon, Rankin & Goetzel, P.C.

(57) ABSTRACT

Dynamic selection of topologies for database data may be performed for performing queries. Different possible query plans for different assignments of topologies are determined for a query. One of the query plans is selected according to a cost-based model that assigns costs to different uses of the different topologies. The query is then performed using the selected query plan.

17 Claims, 11 Drawing Sheets

(56) References Cited

U.S. PATENT DOCUMENTS

2022/0121667 A1      4/2022   Wong
2022/0318060 A1*    10/2022   Choochotkaew ..... G06F 9/5005

OTHER PUBLICATIONS

U.S. Appl. No. 17/810,195, filed Jun. 30, 2022, Krishna Chaitanya Gudipati.

Le Pape, Cecile, et al: "Replica Refresh Strategies in a Database Cluster", High Performance Computing for Computational Science—VECPAR 2006: 7th International Conference, Rio de Janeiro, Brazil, Jun. 10-13, 2006, pp. 679-691, Revised Selected and Invited Papers 7, Springer Berlin Heidelberg, 2007.

Gupta Anurag, et al., "Amazon Redshift and the Case for Simpler Data Warehouses", Proceedings of the 2015 ACM SIGMOD international conference on management of data (SIGMOD '15), pp. 1917-1923, May 27, 2015, ACM Press, New York, New York, USA.

* cited by examiner

DYNAMIC SELECTION OF DATABASE DATA TOPOLOGIES FOR PERFORMING QUERIES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

Figure 1B:
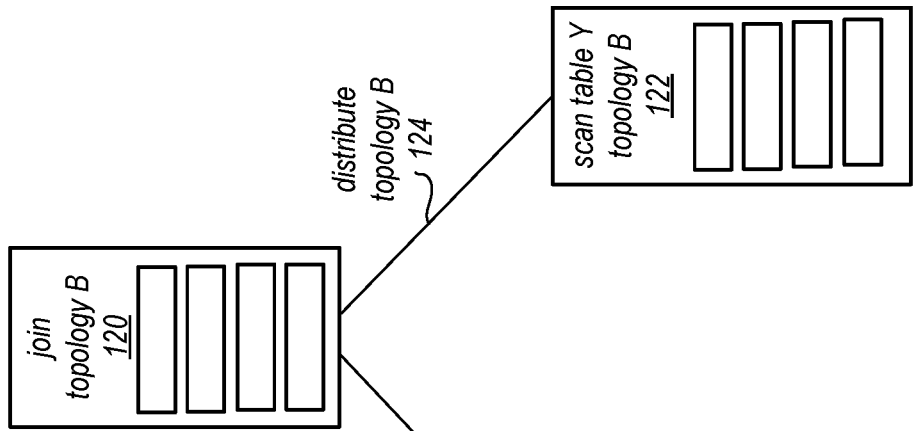
FIGS. 1A-1C are logical block diagrams illustrating example query plans for dynamic selection of database data topologies for performing queries, according to some embodiments

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic selection of database data topologies for performing queries are described herein. In some embodiments, a topology of a table may refer to the number of physical data partitions that the table is partitioned by. Tables may typically be either partitioned using round-robin or using hashing based on a distribution key defined in the table definition, for example. Partitioning data is used in parallel querying systems (also referred to as sharding or bucketing). Some database systems use clusters (or other groups of computing devices) to define a topology per cluster at the time of cluster creation and all tables are created in the cluster's topology. The number of data partitions may depend on the cluster's individual computing node (e.g., computing device) type and number of nodes. For a table that has a distribution key defined, the topology may define, for example, the number of hash buckets on a distribution key that the data stored in the table is partitioned into. A cluster's topology may be leveraged when executing queries on tables that have a distribution key defined to provide efficient query processing by avoiding costly on-demand shuffling of data.

In some embodiments, a data slice is a property of a cluster. A cluster typically has as many data slices as physical data partitions defined by the cluster's topology and each compute node has the same number of data slices. In this case, each physical data partition may be assigned to a data slice. A cluster maintains metadata to state which data partition is housed in what data slice on the cluster. This metadata includes a map that maps all hash keys to the data slice that houses the partition with all values of that hash key.

Query execution is efficient if it can leverage the underlying data partitions defined by a cluster's topology to avoid costly re-shuffling of data. To parallelize the execution of a query, each concurrent worker may need to operate on a distinct subset of the data. For example, to parallelize the execution of an equi-join, both inputs are typically first shuffled by their respective join keys and then each computing resource can compute its subset of the join in isolation. If either of the inputs are already hash partitioned by their join key, then the costly on-demand shuffling can be avoided. Database systems, such as database systems that implement the various techniques of dynamically selecting topologies as discussed below, may leverage the hash partitioning defined by a table's distribution key to avoid on-demand shuffling wherever possible.

In various embodiments, a wide range of topologies may be available given based on, for example, the number of node (e.g., instance) types and number of compute nodes to fit different computational needs. The choice of node type and number of compute nodes may determine a cluster's unique topology. For example, in some database systems there are more than 100 unique topologies, as different node types may have different numbers of slots, and different clusters may have different numbers (one or more) of nodes. Changing the topology of a running system is expensive as all hash and even distributed tables would need to be re-distributed to match the new topology. Many scenarios, like resize and data sharing as discussed below, do not re-distribute the data because of this cost. To improve the performance of a database system, a database system that can be flexible when it comes to topologies will increase the capabilities of the database system to respond to different scenarios (e.g., as discussed below with regard to FIGS. 5-8. For example, the database system may be able to efficiently execute not only its local topology, but also foreign topologies from other clusters or a mixture of local and foreign topologies. In various embodiments, techniques to support multiple topologies in query execution including techniques for using cost-based selection of these topologies may be described.

Efficiently executing a query that only contains tables from a foreign topology may require that the database system can leverage the foreign topology's data partitioning to avoid on-demand shuffling whenever there is a matching distribution key present. In order to do so, the query may need to be executed in the foreign topology. To do this, the data partitions of the topology and to which local data slice they are mapped may need to be known. On-demand shuffling in the foreign topology may also be performed to ensure that hash partitions are created that match the ones existing for the foreign topology.

In various embodiments, to support executing queries in multiple topologies, a database system parameterizes all topology metadata and allows queries to execute in any topology. The core components that may need to be parametrized for each topology are the assignment mapping from hash partitions to data slices and then hash maps used for distribution that maps a hash value to the data slice that hosts the corresponding data partition.

Figure 1A:
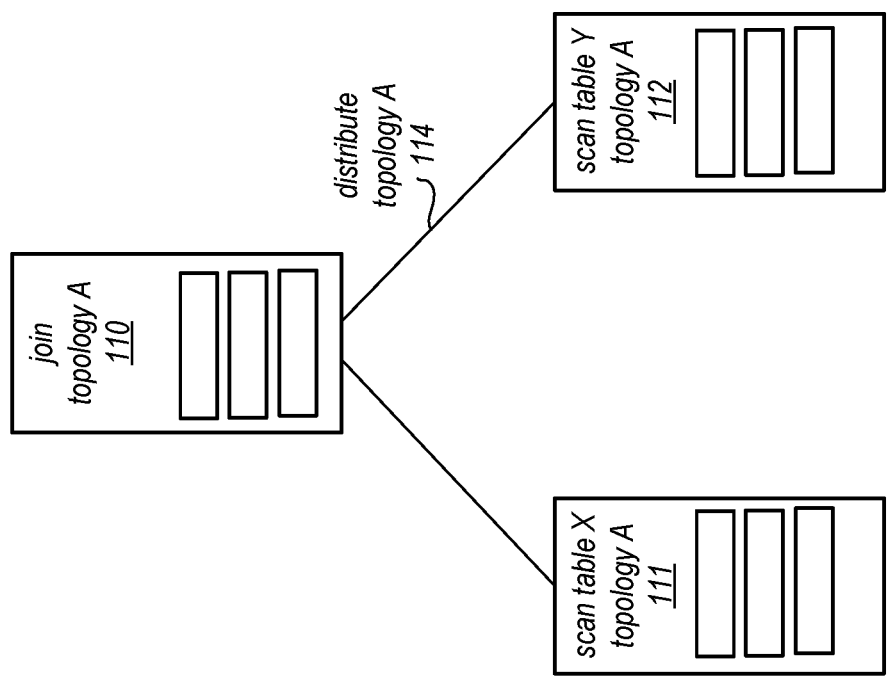

FIGS. 1A-1B are logical block diagrams illustrating an example query plan for dynamic topology selection for performing queries, according to some embodiments. Both FIGS. 1A and 1B, illustrates the same query running in two different topologies. In both cases, the left join input uses a table's underlying data partitions and the right input shuffles on-demand to create matching hash partitions because the underlying table is not partitioned by the join key. For example, a join between table X and Y, has plan nodes 110, 111, and 112, along with distribution instruction 114 according to topology A. Similarly, for topology B, a join between table X and Y, has plan nodes 120, 121, and 122, along with distribution instruction 124 according to topology B.

Figure 1C:
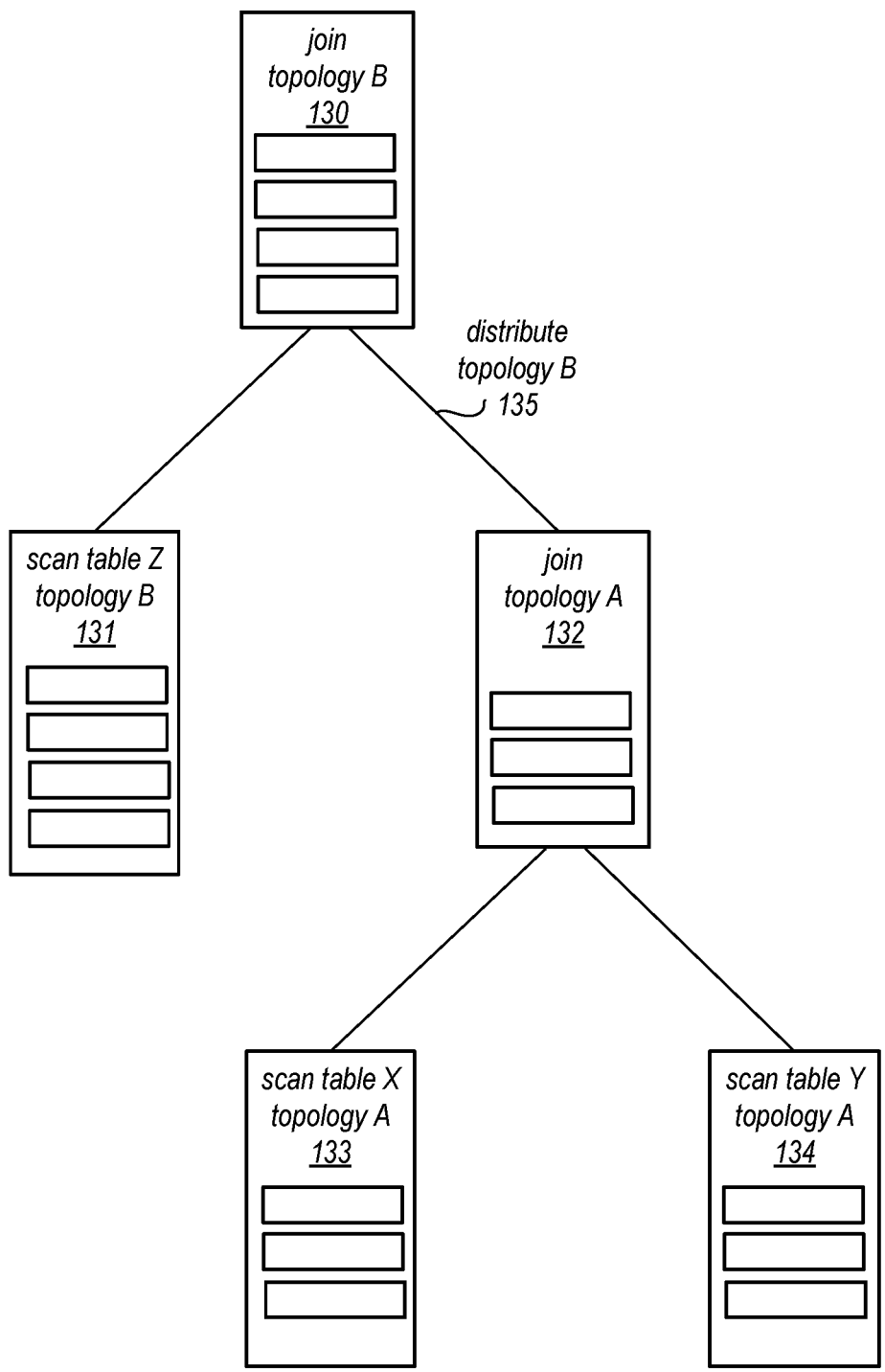

FIG. 1C is a logical block diagram where multiple different topologies are used in a query. For example, if the query contains tables from multiple topologies, then each operation in the query needs to be topology-aware. To support multiple topologies in the same query, the query planner may need to be topology-aware. The query planner may annotate all execution plan nodes in a query plan with their output topology and chooses a plan that can execute sub-plans that have the same topology efficiently in that topology (e.g., based on cost estimations as discussed below). For operations that combine data that is partitioned by different topologies like a join, the query planner first tries to use any shuffling that the join has to perform regardless of topologies to bring both inputs to a common topology. If this is not possible because the join would not have required any on-demand shuffling (e.g., because both join keys match the corresponding distribution keys), then the query planner choses the topology of the larger input as its output topology and adds an on-demand shuffle to its other input to bring both inputs to the same data partitioning scheme. This ensures that sub-plans with the same topology are executed without any additional on-demand data shuffling compared to local execution and mixed-topology operations have to perform minimal on-demand shuffling.

Note that this scheme can be further improved by treating topology as an 'interesting distribution' in the query planner and using a cost-based approach to decide which topology to use as output when an operation combines two. For example, if a query has a left-deep tree consisting of two joins and both join's right input is off topology A, then it could be more beneficial in some cases to distribute the outer input of the first join to topology A and then execute the remaining query as A.

In some embodiments, when writing a result to a local table, the query planner makes sure that the data is partitioned by the cluster's local topology. The execution engine is using the query planner's plan annotations to make sure that all parts of the query are executed in the topology determined by the planner. Each table scan and data distribution is topology-aware and uses the parameterized topology metadata to efficiently switch between topologies while evaluating parts of the query.

FIG. 1C illustrates a query with two joins off two different topologies A and B. The sub-tree of the first join 132, 133, and 134, can fully be executed in topology A whereas the final join 130 has to re-distribute 135 to bring both its inputs 131 and 132 to a common topology.

In some embodiments, the following table illustrates common join cases between tables off different topologies and compares the need of data distribution with the local/same topology case. Note that only one of the cases requires adding additional data distribution:

TABLE 1

| Local/Same topology Join Strategy | Different Topology Join Strategy |
|---|---|
| Distribute both inputs | Distribute both inputs |
| Distribute inner input only | Distribute inner input only |
| Distribute outer input only | Distribute outer input only |
| No distribution needed | Distribute inner or outer |

Avoiding costly redistribution is the most efficient strategy for common cases. However, for cases where the remote topology has significantly less partitions than the local topology, execution may suffer from a lack of parallelism. For example, installing a topology with 16 partitions on a 32-node cluster leaves half of the compute nodes without assigned data and, therefore, idle. In such scenarios, it is better to immediately convert to the local topology after scanning tables from this remote topology. This allows that after the scan and distribution, the performance of the rest of the query matches that of the local topology.

Please note that the previous description of query plans are logical descriptions and thus is not to be construed as limiting as to the implementation of these features.

This specification continues with a general description of a provider network that implements database services (or other data storage or processing services) that may implement using computer resources to perform database queries and implement different topologies. Then various examples of one such database service, including different components/modules, or arrangements of components/module that may be employed as part of implementing the techniques are discussed. A number of different methods and techniques to implement dynamic topology selection for performing queries, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
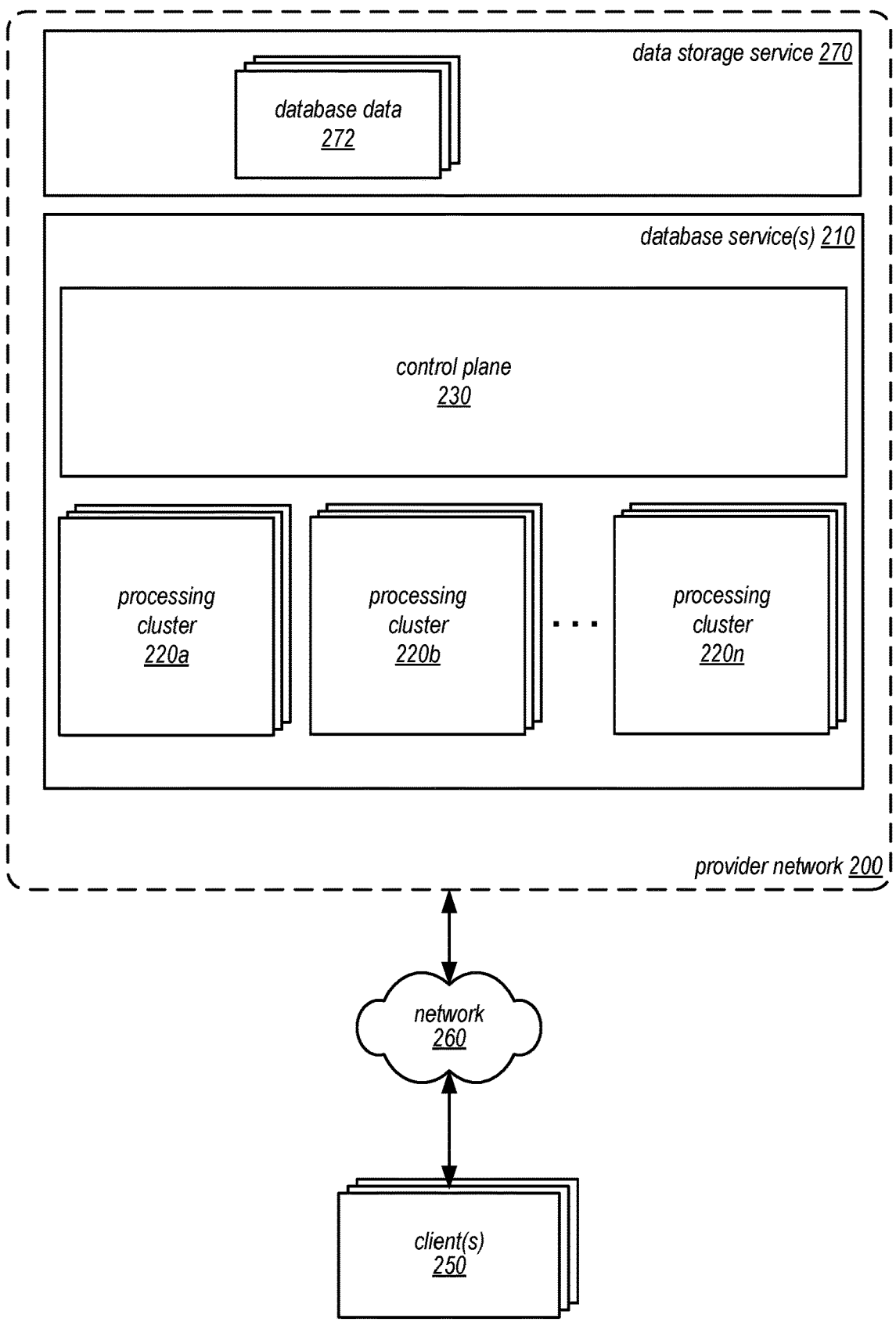
FIG. 2 is a logical block diagram illustrating a provider network offering a database service that utilizes different topologies in the database service, according to some embodiments.

FIG. 2 is a logical block diagram illustrating a provider network offering a database service that utilizes different topologies in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
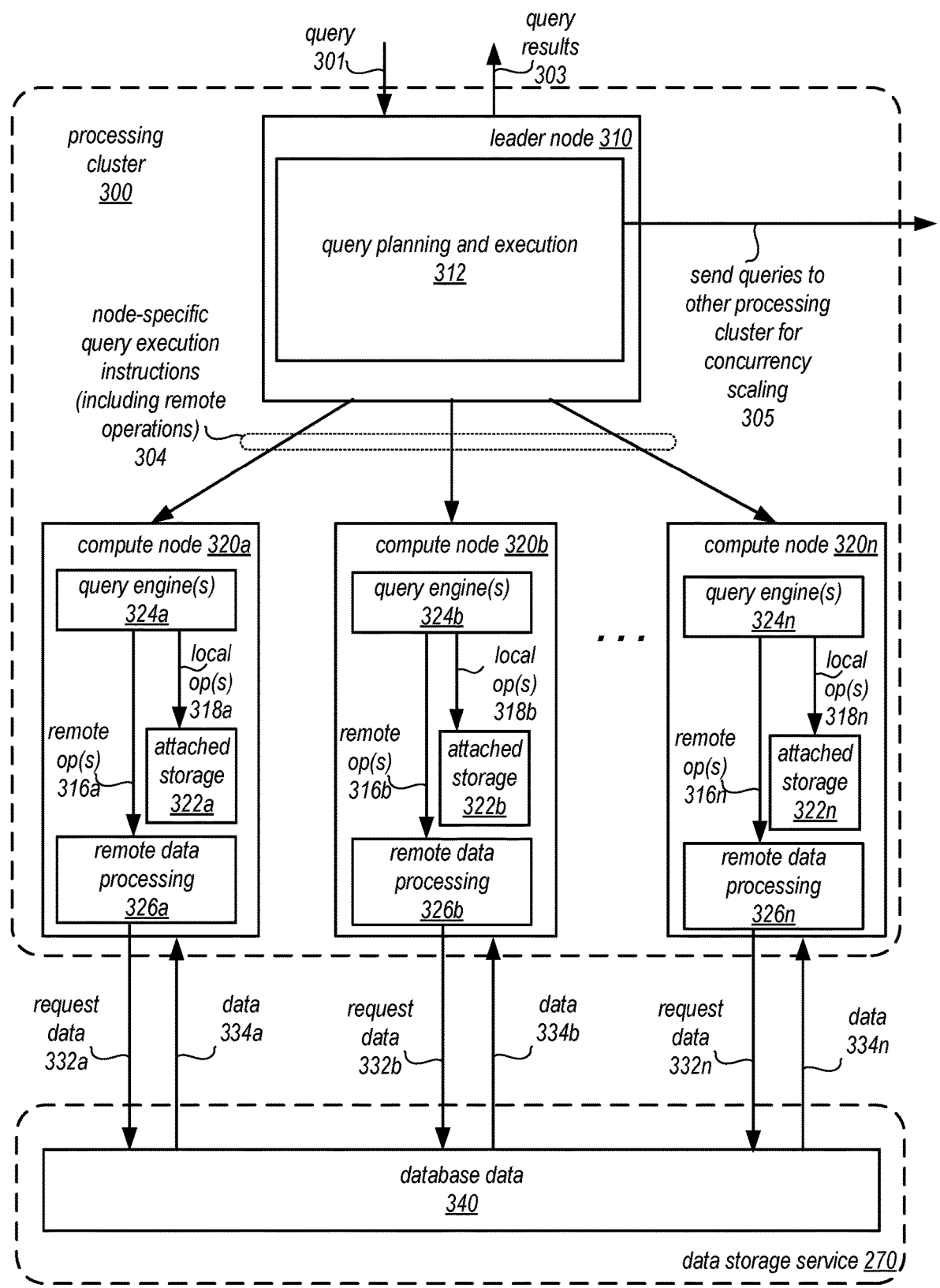
FIG. 3 is a logical block diagram illustrating a processing cluster of a database service that query planning and execution that also accounts for topologies, according to some embodiments.

FIG. 3 is a logical block diagram illustrating a processing cluster of a database service that query planning and execution that also accounts for topologies, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect(not illustrated), in one embodiment. Leader node 310 may implement query planning and execution 312 to generate plan(s), including accounting for different available topologies as discussed below, and instructions 314 for executing various requests 302, such as a query, or requests to update, add, modify, or remove data, on processing cluster 300, in one embodiment.

Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
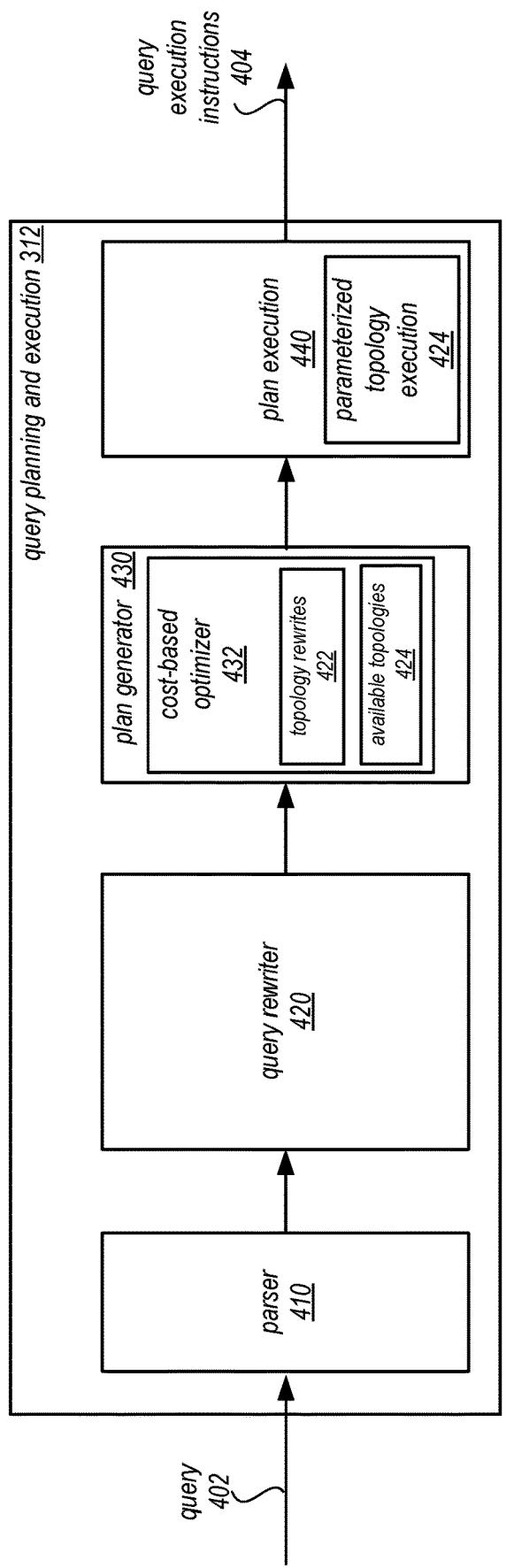
FIG. 4 is a logical block diagram illustrating query planning for a query engine implemented by a processing cluster that implements dynamic topology selection for performing queries, according to some embodiments.

FIG. 4 is a logical block diagram illustrating query planning for a query engine implemented by a processing cluster that implements dynamic topology selection for performing queries, according to some embodiments. Query planning and execution 312 may implement parser 410 to receive a query statement, such as a SQL statement, and determine the various requested operations to perform as a result of the query. For example, parser 410 may generate a query tree for a given query input string to separate out the various query clauses, fields, predicates, conditions, commands, or other query information for planning and optimization.

Query planning and execution 312 may implement query rewriter 420 to rewrite the parsed query, in some embodiments. Different query rewriting rules may be applied to determine the parsed queries (e.g., by determining an initial symbol tree or other expansion of the query, then rewriting the query in different ways to rearrange the locations of operators). Query rewriting rules may, for instance, identify modifications to the initially created symbol tree by rearranging or re-ordering operations. Some query rewriting rules may involve different choices (e.g., different orderings of operations, such as joins, as well as different assignments or uses of topologies), and thus the different possible query plans may be generated as a result of the different choices identified by the query rewriting rules.

Query rewriter 420 may also perform other rewrites to further optimize performance of the query. For example, query rewriter 420 may have access to metadata (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

The rewritten query may then be provided to plan generator 430. Plan generator 430 may perform various operations to generate a query execution plan (e.g., a tree of plan operation nodes, which may be later used to generate query execution code). For example, as discussed above with regard to FIG. 1, plan generator 430 may identify available topologies (e.g., as may be used in the various scenarios discussed below with regard to FIGS. 5-8). These available topologies 424 may then be applied to rewrite queries according to topology, as indicated at 422. For example, different topologies may be selected for each table on a different side of the join (e.g., making them match, utilizing separate topologies, etc.), as discussed in the examples above. As discussed above with regard to FIGS. 1A-1B, a query plan may be annotated with the topology to be used for each operation (or set of operations). For example, plan generator may perform a cost-based optimization using a cost model that accounts for different topologies to select one of various combinations or orderings of plan operator nodes in a tree produces a least costly plan to execute. These different plans may include, as discussed above, the different possible assignments of topologies. Plan generator 430 may also implement partition elimination, which may use metadata to filter out partitions (e.g., portions of or entire data objects) from evaluation for executing the query. For example, partition elimination may receive a list of predicates as part of query 402 and along with a list of partitions (for local and/or remote data) along with range values or other information describing the values stored within the partitions. If an evaluation of a predicate compared with the range values or other value description information were to exclude that partition from satisfying the query predicate (e.g., values in the partition are out of a range for the predicate), then operations to evaluate (e.g., scan) the partition may be removed. In scenarios where the partitions removed are partitions of remote data, in addition to saving processing costs, removal of partitions would save transmission costs (e.g., network bandwidth) to move results from remote data.

Request planning and execution 312 may implement plan execution 440. Plan execution 440 may receive the selected query plan, generate instructions to perform the query plan, and send the query execution instructions (e.g., to compute nodes of a processing cluster in FIG. 3). For example, the instructions may be generated and sent as code (or executables). Parameterized topology execution 424 may allow for the different topology data (e.g., assignment mapping from hash partitions to data slices and then hash maps used for distribution that maps a hash value to the data slice that hosts the corresponding data partition) to be included (or made available for lookup) by each of the compute nodes (or inserted as part of plan execution 440 when generating the instructions). In this way, whatever topolog(ies) are used in the selected query plan, query execution instructions 404 will use them.

Figure 5:
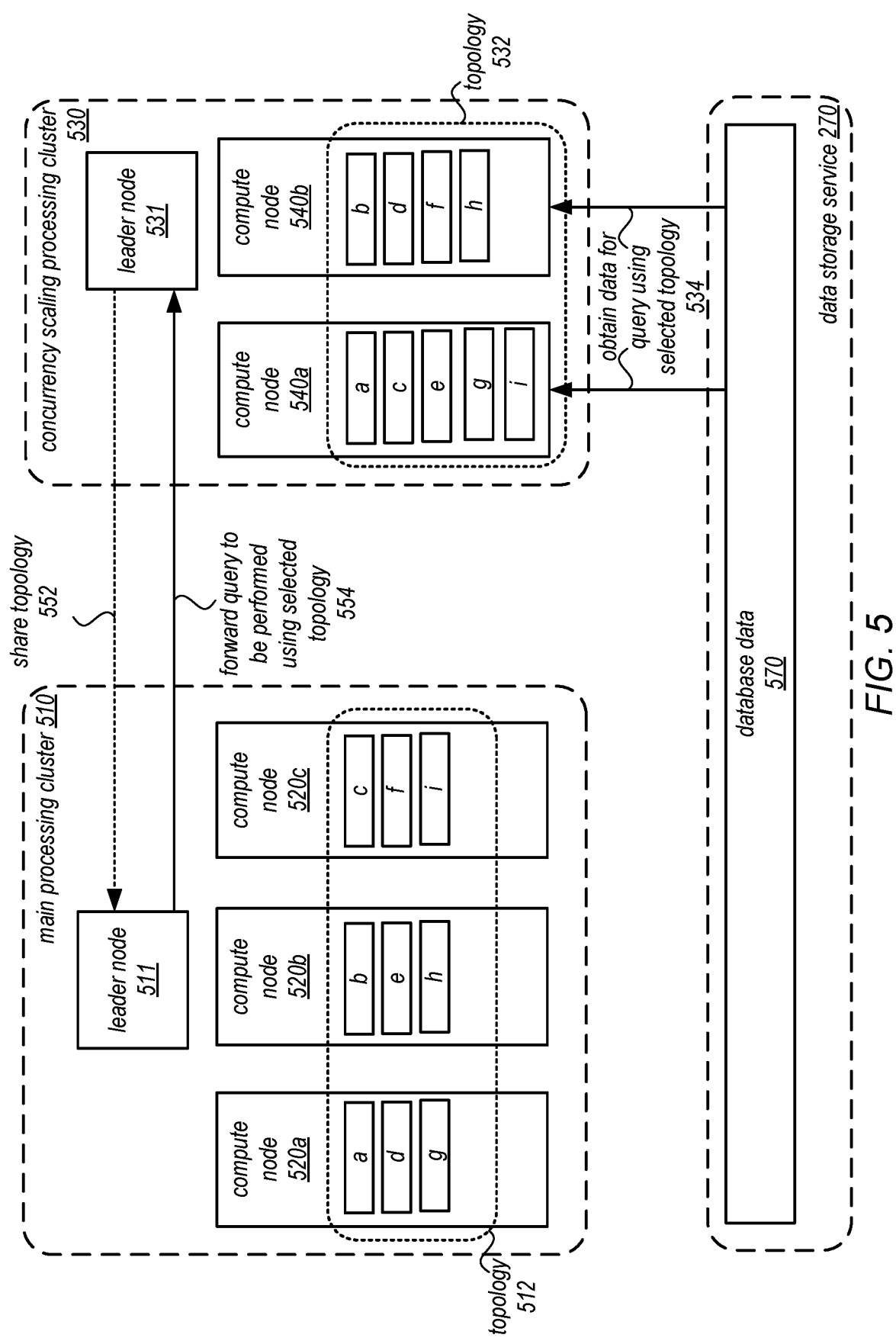
FIG. 5 is a logical block diagram illustrating a dynamic topology selection scenario when a concurrency scaling processing cluster is used, according to some embodiments.

FIG. 5 is a logical block diagram illustrating a dynamic topology selection scenario when a concurrency scaling processing cluster is used, according to some embodiments. Main processing cluster 510 (e.g., similar to processing clusters 220 and 300 discussed above), may store one or more tables at compute nodes 520*a*, 520*b*, and 520*c* (and also possibly in storage 270 as discussed above with regard to FIG. 2) according to topology for local table 512 (e.g., storing partitions a through i). Concurrency scaling processing cluster 530 with compute nodes 540*a* and 540*b* (e.g., similar to processing clusters 220 and 300 discussed above), may be added and used to provide additional query processing capacity to that of processing cluster 510. Concurrency scaling processing cluster 530 may process queries to the database of processing cluster that are forwarded by main processing cluster 510.

In some embodiments, concurrency scaling processing cluster 530 may use the topology 512 of main processing cluster. In other embodiments, concurrency scaling processing cluster 530 may use the topology 532 of concurrency scaling processing cluster. As indicated at 552, in some embodiments, the topology of concurrency scaling processing cluster 530 may be shared 552 with leader node 511 in order to generate a query plan (according to the techniques discussed above). Leader node 511 may then perform dynamic topology selection to determine which topolog(ies) to use as part of forwarding the query to be performed according to the selected topology, as indicated at 554, to leader node 531. Although not illustrated, in some embodiments, leader node 531 may perform query planning and dynamic topology selection. Each compute node 540 may obtain data from the shared table according to the selected topology, as indicated at 534 (e.g., using a topology 512 or 532).

Consider an example where concurrency scaling to an additional processing cluster is a scale-out solution to linearly scale with query concurrency by adding additional clusters and transparently re-routing the user's queries to these clusters. Concurrency scaling clusters can have a different size compared to the user's main cluster and, hence, can support a different topology than the main cluster 510. The mechanism described in executing queries in a foreign topology, as discussed above may be used to allow these clusters to execute queries on the user's main cluster's tables and topology. To do so, the main cluster's data partitions are first assigned to the concurrency scaling cluster's slices, as indicated at 532 and the topology metadata of the main cluster is installed. This metadata contains all hash-to-partition-to-slice mappings needed to execute the query efficiently in the main cluster's topology. In some embodiments, a cost-based analysis may be performed to select an alternative topology use (e.g., of the concurrency scaling cluster).

Figure 6:
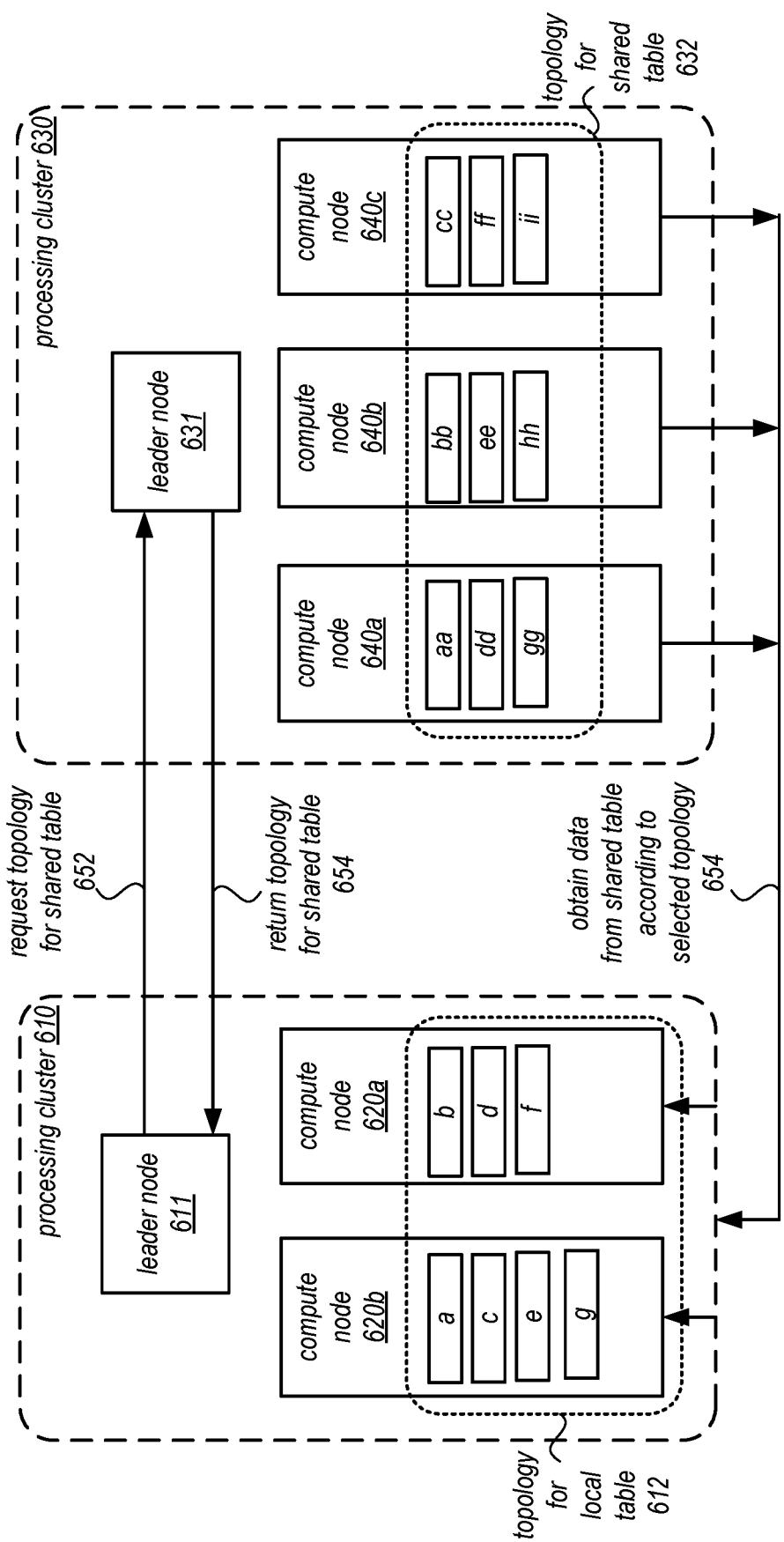
FIG. 6 is a logical block diagram illustrating a dynamic topology selection scenario when a table is shared across processing clusters, according to some embodiments.

FIG. 6 is a logical block diagram illustrating a dynamic topology selection scenario when a table is shared across processing clusters, according to some embodiments. Processing cluster 610 (e.g., similar to processing clusters 220 and 300 discussed above), may store one or more tables at compute nodes 620*a* and 620*b* (and also possibly in storage 270 as discussed above with regard to FIG. 2) according to topology for local table 612 (e.g., storing partitions a through g). Processing cluster 630 (e.g., similar to processing clusters 220 and 300 discussed above), store one or more tables at compute nodes 630*a*, 630*b*, and 630*c* (and also possibly in storage 270 as discussed above with regard to FIG. 2) according to topology for shared table 6322 (e.g., storing partitions aa through ii). Various approval techniques may be supported by database services 210 to share data from one database with another. In the illustrated example, one or more tables on processing cluster 630 may be shared with processing cluster 610.

Processing cluster 610 may apply dynamic topology selection techniques to choose between the different topologies 612 and 632 when processing a query that uses the shared table. Leader node 611 (similar to leader node 310 in FIG. 3) may send a request for the topology of the shared table 652 to leader node 631. Leader node 631 may return the topology for the shared table, as indicated at 654. Then, when a selection of a topology is made in order to determine the assignments of compute nodes 620*a* and 620*b* to perform a query using the shared table, each compute node 620 may obtain data from the shared table according to the selected topology, as indicated at 654 (e.g., using a topology 612 or 632).

Consider an example, where data sharing allows users to share tables from a producer cluster to a consumer cluster. If the producer has a different instance type or a different number of nodes to the consumer than the producer's tables are off a foreign topology to the local topology of the consumer. The techniques above allow for executing queries in a foreign topology in order to efficiently execute these queries on tables from the remote topology without any additional on-demand shuffling (e.g., when compared to executing the same query on local data). Accessing local and remote tables from multiple producers is also executed efficiently with minimal additional shuffling, as discussed above with regard to FIG. 1B.

Figure 7:
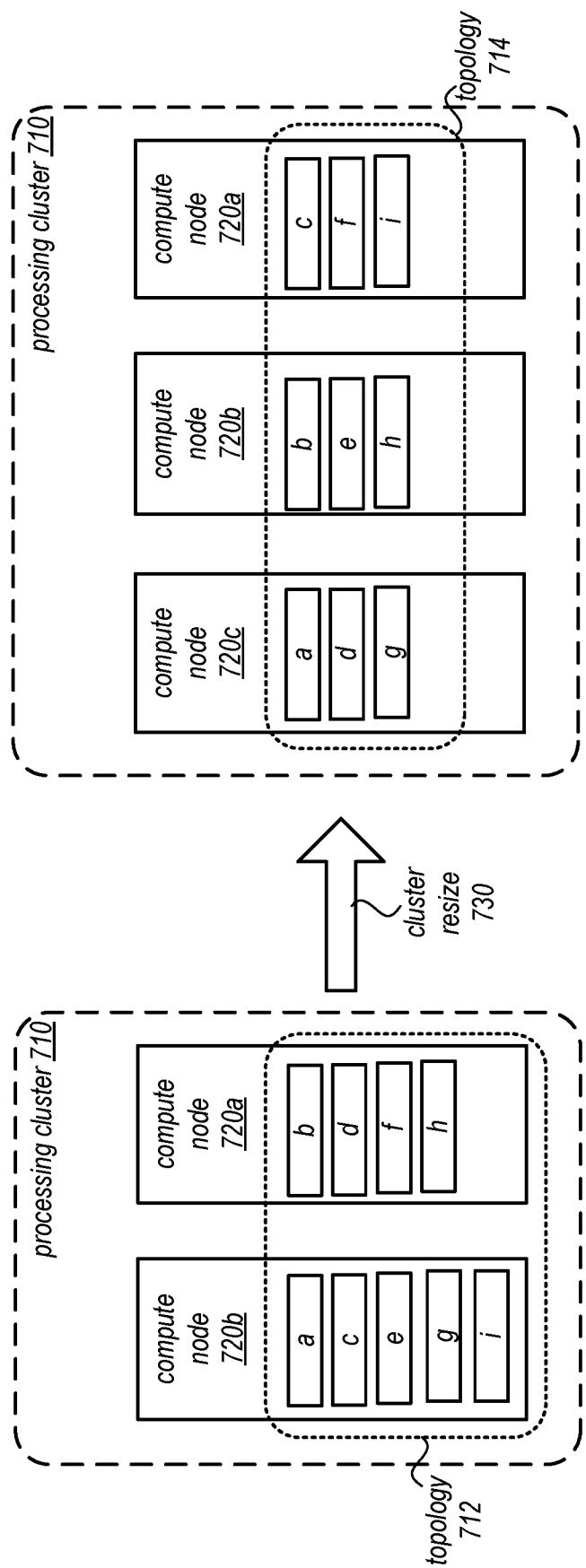
FIG. 7 is a logical block diagram illustrating a dynamic topology selection scenario when a resize of a processing cluster is performed, according to some embodiments.

FIG. 7 is a logical block diagram illustrating a dynamic topology selection scenario when a resize of a processing cluster is performed, according to some embodiments. Processing cluster 710 may have compute nodes 720*a*, 720*b*, and 720*c*, with a topology 712 where partitions a through i are distributed between compute nodes 720*a*, 720*b*, and 720*c*. If a processing cluster resize to occur (e.g., in response to a user request or automatically determined), as indicated at 730, processing cluster 710 would have one additional nodes (e.g., compute node 720*c*). Instead of making processing cluster 710 unavailable to perform queries during the resize, dynamic topology selection could utilize the old topology 712 or the new topology, as indicated at 714, while the resize is performed. In some embodiments, topology changes may result in changes in types of compute nodes (e.g., with greater numbers of slices) or both changes in number and changes in type. Thus, in some embodiments, the resize could mean that the same number of nodes are retained but with a different number of slices, allowing for a different number of partitions.

Consider an example, where resize operates in different phases, such as where resize (and restore to a different cluster size) can operates in two phases. The first phase adds or removes compute nodes, but does not change the topology. It instead moves data partitions around to ensure that all nodes host a similar amount of data. The second phase then uses autoworkers to change the topology of each table to the cluster's new topology. The transformation to the new topology is performed by re-distributing the data in each table by background workers when the cluster is at low load. During the time of the transformation of tables to the new topology, the cluster has two different topologies that coexist in the cluster and queries operate on both topologies. Supporting multiple topologies efficiently improves query performance for the duration of transforming queries from the old topology into the new one.

Figure 8:
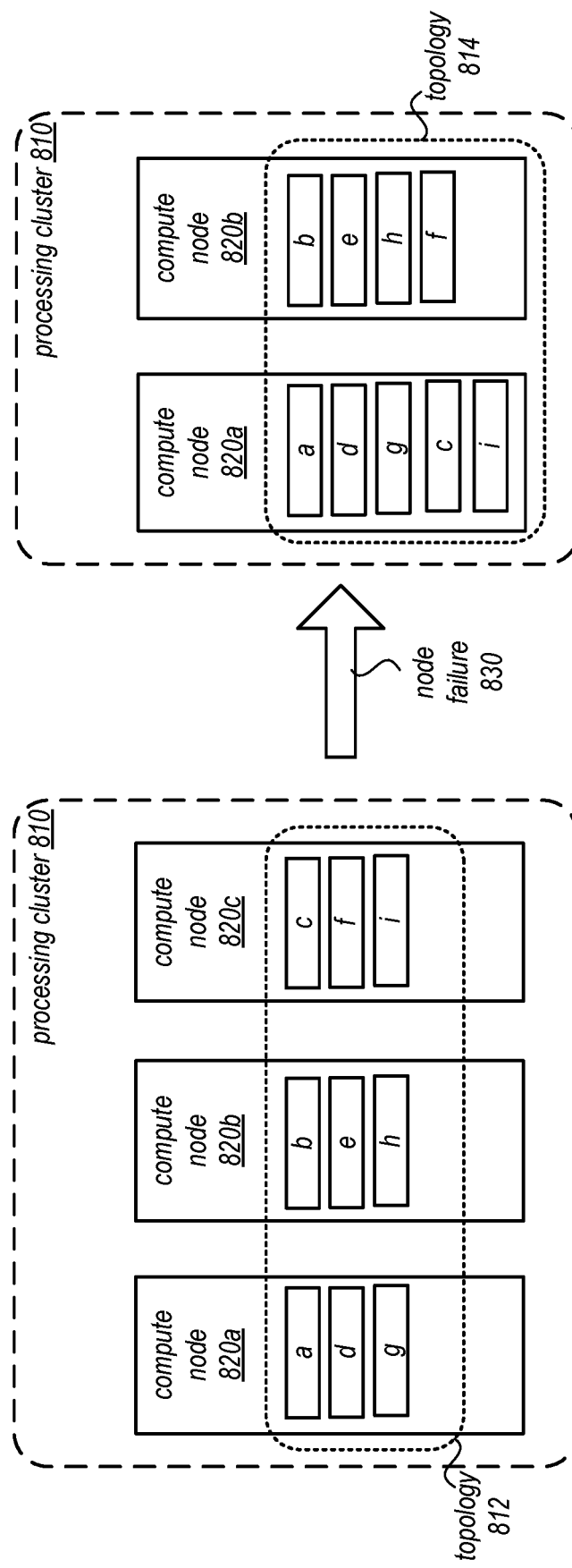
FIG. 8 is a logical block diagram illustrating a dynamic topology selection scenario when a node failure of a processing cluster occurs, according to some embodiments.

FIG. 8 is a logical block diagram illustrating a dynamic topology selection scenario when a node failure of a processing cluster occurs, according to some embodiments. Processing cluster 810 may have compute nodes 820*a*, 820*b*, and 820*c*, with a topology 812 where partitions a through i are distributed between compute nodes 820*a*, 820*b*, and 820*c*. If a node failure were to occur, as indicated at 830, processing cluster 810 would have two remaining nodes (e.g., compute node 820*a* and 820*b*). Instead of making processing cluster 810 unavailable to perform queries, dynamic topology selection could utilize a different topology, as indicated at 814, while compute node 820*c* is recovered.

For instance, in the case of a single node failure, the data partitions from the node that failed can be evenly re-mapped to unused data slices on the remaining nodes. Doing so, temporarily creates a new topology that can be executed on the reduced-size cluster until the failed node is replaced. Note that a topology may not only describe the number of partitions, but also the order in which the partitions are mapped to compute nodes. Once the failed node is replaced, the transition between the reduced-size cluster and the regular cluster is fluid without requiring a cluster restart. Queries can utilize both topologies at the same time. In some embodiments, a cost model can be used to recognize when an unavailable node's cost makes the selection of a query plan using that topology higher than the cost of a query plan using the new topology.

Figure 9:
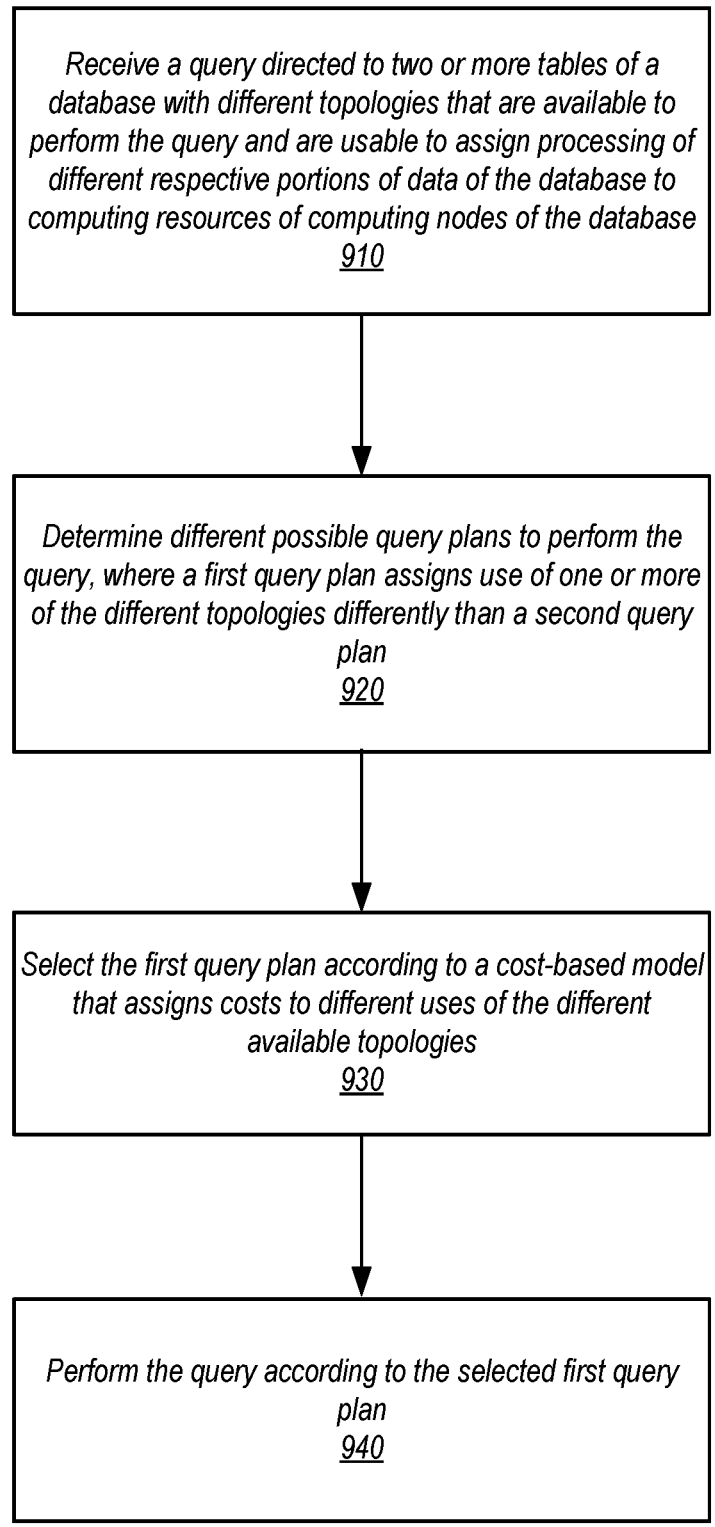
FIG. 9 is a high-level flowchart illustrating methods and techniques to implement dynamic selection of database data topologies for performing queries, according to some embodiments.

Although FIGS. 2-8 have been described and illustrated in the context of a database service, like a data warehouse service implementing a columnar relational database table, the various components illustrated and described in FIGS. 2-8 may be easily applied to other database or data storage systems that implement or use different topologies of database data. As such, FIGS. 2-8 are not intended to be limiting as to other embodiments of a storage engine, query engine, a single or distributed database engine or management system, processing cluster, or other component that may implement using computer resources to perform queries using different database data topologies. FIG. 9 is a high-level flowchart illustrating methods and techniques to implement dynamic selection of database data topologies for performing queries, according to some embodiments. Various different systems and devices may implement the various methods and techniques described below, either singly or working together. For example, a processing cluster, such as described above with regard to FIGS. 2-8 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 910, a query directed to two or more tables of a database with different topologies that assign processing of different respective portions of data of the database to computing devices are available for performing the query to the two or more tables. As discussed above with regard to FIGS. 1A and 1B, a topology may refer to the number of partitions into which a table is partitioned along with their assignments to respective computing nodes (e.g., nodes, processors, or other components that perform query processing, which in some cases may be a number of slices that a node supports, where a slice provides independent processing capacity for assigned data). As discussed in detail above with regard to FIGS. 5-8, different scenarios may occur in which different topologies may be available for performing a query, including but, not limited to, sharing tables between processing clusters, resizing processing clusters to different configurations, using additional processing clusters to scale out processing capacity, or handling failures in a processing cluster.

In various embodiments, a database system may implement a query planner and/or optimizer to generate, evaluate, and select a query plan for performing the query. For example, as indicated at 920, different possible query plans may be determined to perform the query, where a first query plan assigns use of one of the different topologies differently than a second query plan. For example, different topologies may be selected for each table on a different side of the join (e.g., making them match, utilizing separate topologies, etc.), as discussed in the examples above. Different query rewriting rules may be applied to determine the different possible query plans (e.g., by determining an initial symbol tree or other expansion of the query, then rewriting the query in different ways to rearrange the locations of operators). Query rewriting rules may, for instance, identify modifications to the initially created symbol tree by rearranging or re-ordering operations. Some query rewriting rules may involve different choices (e.g., different orderings of operations, such as joins, as well as different assignments or uses of topologies), and thus the different possible query plans may be generated as a result of the different choices identified by the query rewriting rules.

As indicated at 930, in some embodiments the first query plan may be selected according to a cost-based model that assigns costs to different uses of the different available topologies, in some embodiments. For example, the cost-based model may assign different performance costs to topology assignments according to whether, or not, the topology assignment is change from the native or original topology of a table (e.g., if the external or remote table is in topology B but the cluster performing the query uses topology A, then a higher cost may be assigned to scenarios where the query is performed on the external or remote table in topology A instead of topology B. Various other cost-based modeling implications of topologies may be used. For instance, topology choice in conjunction with an operator such as a join may lead to different overall costs that might, for example, contravene the earlier example. For example, if a query has a left-deep tree consisting of two joins and both join's right input is off topology A, then it could be more beneficial in some cases to distribute the outer input of the first join to topology A and then execute the remaining query as A. In some embodiments, a query planner may implement the above techniques by treating topology as an 'interesting distribution' in the planner and using a cost-based approach to decide which topology to use as output when an operation combines two. In some embodiments, a query may provide a query hint (specified in the query) which may indicate a particular topology to use.

As indicated at 940, the query may be performed according to the selected first query plan. For example, a query execution engine may obtain the partition mappings for the assigned topologies as may be annotated in the selected query plan and provide them as part of execution instructions sent to different nodes in a processing cluster. In some embodiments, each table scan and data distribution is topology-aware and uses the parameterized topology metadata to efficiently switch between topologies while evaluating parts of the query. In some embodiments, when writing a result to a local table, the planner makes sure that the data is partitioned by the cluster's local topology.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of as dynamic selection of database data topologies for performing queries described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB)

standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
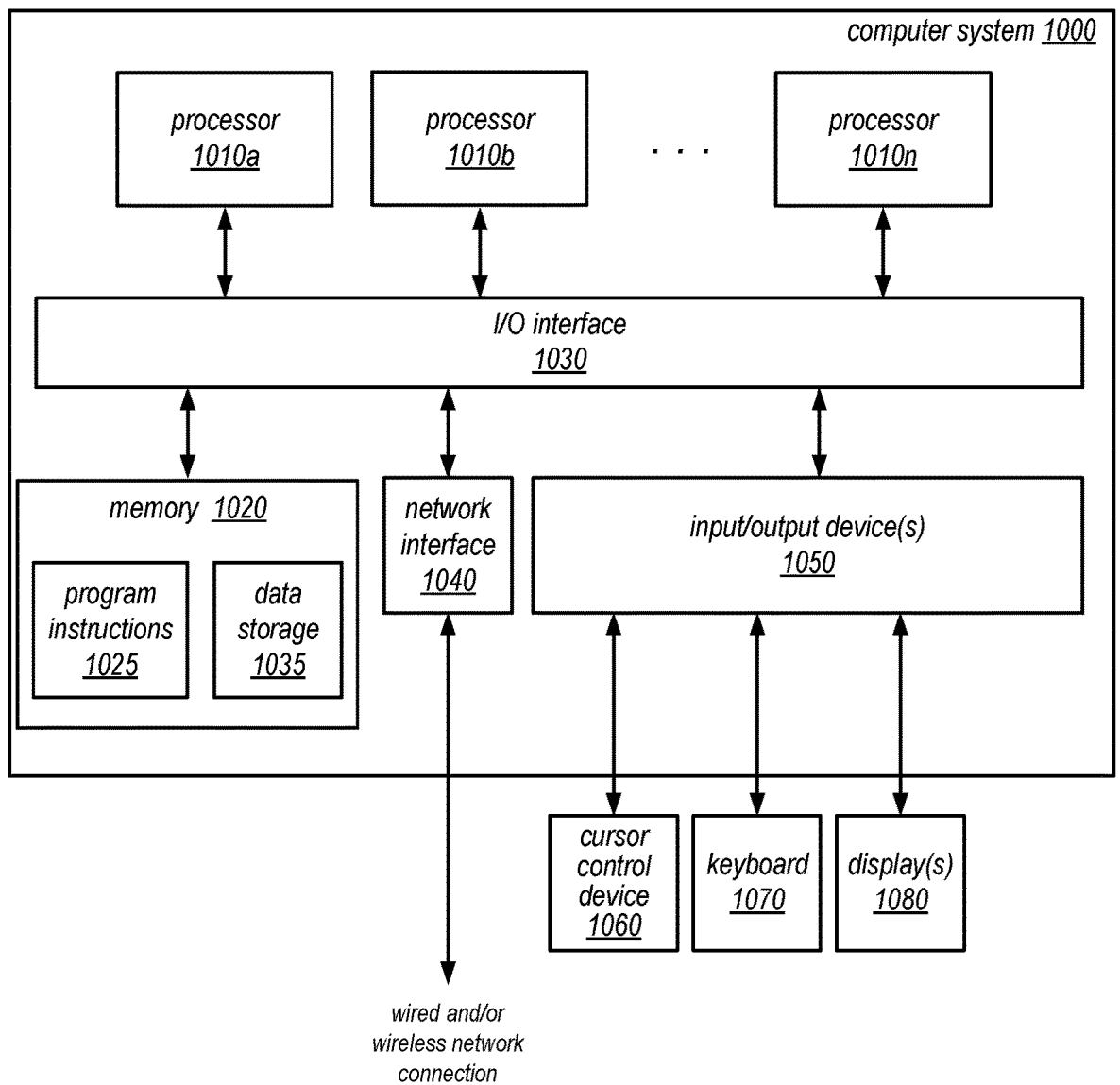
FIG. 10 illustrates an example system to implement the various methods, techniques, and systems described herein, according to some embodiments.

As shown in FIG. 10, memory 1020 may include program instructions 1025, may implement the various methods and techniques as described herein for implementing optimizing selection of materialized views for creation or refresh, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processing cluster for a database, wherein the processing cluster comprises a plurality of computing nodes, and wherein the processing cluster is configured to:
receive a query directed to two or more tables of the database, wherein a first topology comprises a first distribution of physical data partitions amongst a first number of computing nodes of respective node types, wherein a second topology comprises a second distribution of the physical data amongst a second number of computing nodes of respective node types, wherein the first topology is different from the second topology, and wherein the first topology and the second topology are usable to make different assignments for processing different respective portions of data of the database to computing resources of the plurality of computing nodes, wherein one of the two or more tables is a shared table stored at another processing cluster, wherein the second topology is a foreign topology for the shared table is obtained from a leader node of the other processing cluster;
generate different possible query plans to perform the query, wherein a first query plan of the different possible query plans assigns use of one of the first topology or the second topology differently than a second query plan of the different possible query plans;
determine that the first query plan is a lowest cost query plan according to a cost-based model that assigns costs to different uses of the first topology and the second topology;
execute the first query plan to perform the query, wherein to execute the first query plan to perform the query, the processing cluster is configured to obtain database data for the shared table from the other cluster or from a data store accessible to the other cluster.

2. The system of claim 1, wherein the first topology is a local topology that corresponds to a different configuration of the processing cluster according to a resize operation.

3. The system of claim 1, wherein the processing cluster is implemented as part of a database service implanted as part of a provider network.

4. A method, comprising:
receiving, at a database system comprising a plurality of computing nodes, a query directed to two or more tables of a database, wherein a first topology comprises a first distribution of physical data partitions amongst a first number of computing nodes of respective node types, wherein a second topology comprises a second distribution of the physical data amongst a second number of computing nodes of respective node types, wherein the first topology is different from the second topology, and wherein the first topology and the second topology are usable to make different assignments for processing of different respective portions of data of the database to computing resources of the plurality of computing nodes, wherein one of the two or more tables is a shared table stored at a second plurality of computing nodes, wherein the second topology is a foreign topology for the shared table is obtained from the second plurality of computing nodes;
determining, by the database system, different possible query plans to perform the query, wherein a first query plan of the different possible query plans assigns use of one of the first topology or the second topology differently than a second query plan of the different possible query plans;
selecting, by the database system, the first query plan according to a cost-based model that assigns costs to different uses of the first topology and the second topology; and
performing, by the database system, the query according to the selected first query plan, comprising obtaining database data for the shared table from the second plurality of computing nodes or from a data store accessible to the second plurality of computing nodes.

5. The method of claim 4, wherein the plurality of computing nodes is a processing cluster, and wherein the first topology is a local topology that corresponds to a different configuration of the processing cluster according to a resize operation.

6. The method of claim 5, wherein the resize operation changes a number of nodes in the processing cluster.

7. The method of claim 4, wherein the plurality of computing nodes is a main processing cluster, and wherein one of the first topology or the second topology corresponds to a concurrency scaling processing cluster added for performing queries to the database.

8. The method of claim 4, wherein the plurality of computing nodes is a concurrency scaling processing cluster, and wherein one of the first topology or the second topology corresponds to a concurrency scaling processing cluster added for performing queries to the database.

9. The method of claim 4, wherein the plurality of computing nodes is a processing cluster, and wherein one of the first topology or the second topology corresponds to a different configuration of the processing cluster where one node of the processing cluster is unavailable.

10. The method of claim 4, wherein a result for the query is stored in a local topology for the plurality of computing nodes.

11. The method of claim 4, wherein the database system is a data warehouse system.

12. One or more non-transitory, computer-readable storage media, storing program instructions that when executed on or across one or more computing devices cause the one or more computing devices to implement:
receiving a query directed to two or more tables of a database, wherein a first topology comprises a first distribution of physical data partitions amongst a first number of computing nodes of respective node types, wherein a second topology comprises a second distribution of the physical data amongst a second number of computing nodes of respective node types, wherein the first topology is different from the second topology, wherein the first topology and the second topology are usable to make different assignments for processing different respective portions of data of the database to computing resources of the plurality of computing nodes, wherein one of the two or more tables is a shared table stored at a second one or more computing devices, and wherein the second topology is a foreign topology for the shared table that is obtained from the second one or more computing devices;

generating different possible query plans to perform the query, wherein a first query plan of the different possible query plans assigns use of one of the first topology or the second topology differently than a second query plan of the different possible query plans;

determining that the first query plan is a lowest cost query plan according to a cost-based model that assigns costs to different uses of the first topology and the second topology; and performing the query according to the first query plan, wherein in performing the query according to the selected first query plan, the program instructions cause the one or more computing devices to implement obtaining database data for the shared table from the second one or more computing devices or from a data store accessible to the second one or more computing devices.

13. The one or more non-transitory, computer-readable storage media of claim 12, wherein the one or more computing devices is a processing cluster, and wherein one of the first topology or the second topology corresponds to a different configuration of the processing cluster according to a resize operation.

14. The one or more non-transitory, computer-readable storage media of claim 13, wherein the resize operation changes a type of one or more nodes in the processing cluster.

15. The one or more non-transitory, computer-readable storage media of claim 12, wherein the one or more computing devices is a main processing cluster, and wherein one of the first topology or the second topology corresponds to a concurrency scaling processing cluster added for performing queries to the database.

16. The one or more non-transitory, computer-readable storage media of claim 12, wherein the one or more computing devices is a processing cluster, and wherein one of the first topology or the second topology corresponds to a different configuration of the processing cluster where one node of the processing cluster is unavailable.

17. The one or more non-transitory, computer-readable storage media of claim 12, wherein the one or more computing devices are a processing cluster implemented as part of a database service implanted as part of a provider network.

* * * * *